Nov. 17, 1970 — G. P. ARTAUD — 3,540,325
SELF-CENTERING DEBURRING TOOL
Filed Feb. 8, 1968
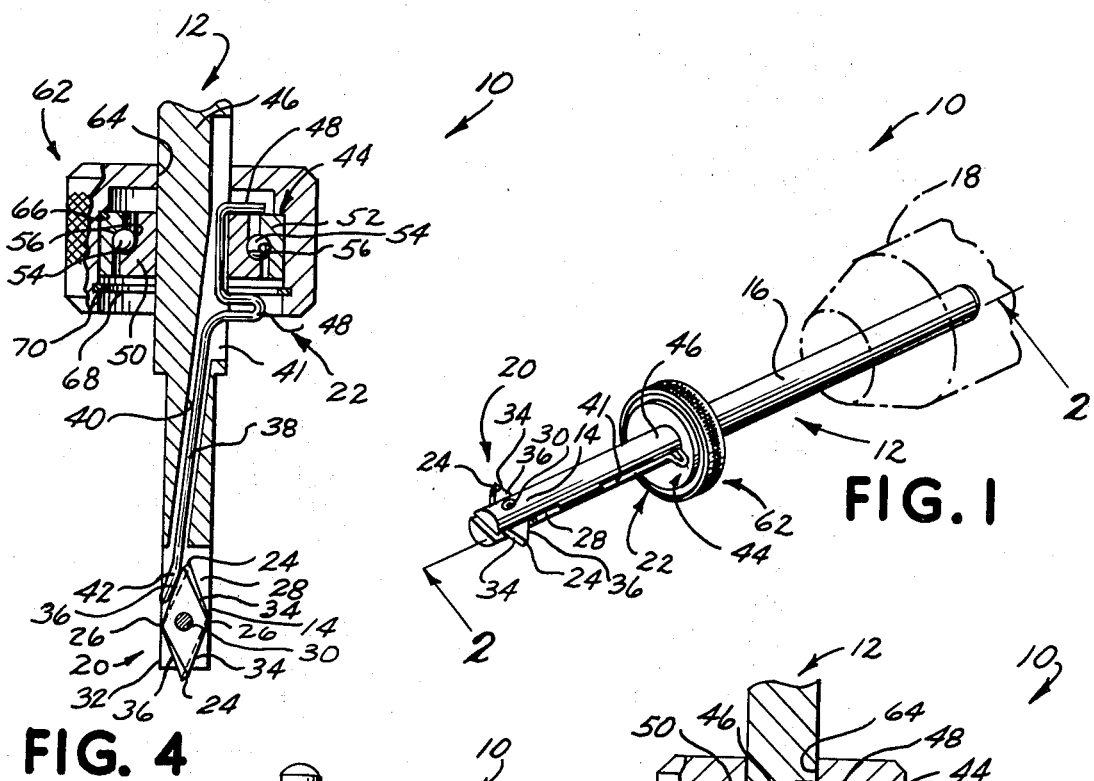
FIG. 1
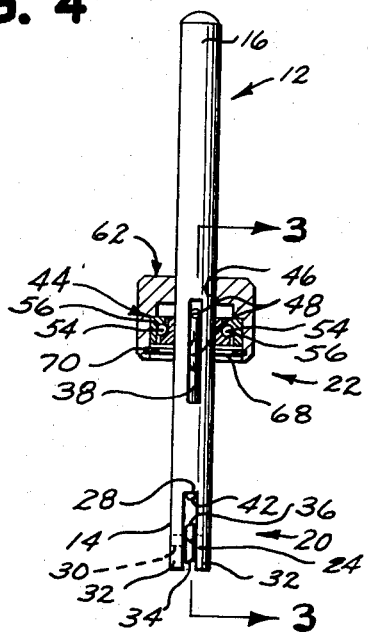
FIG. 4
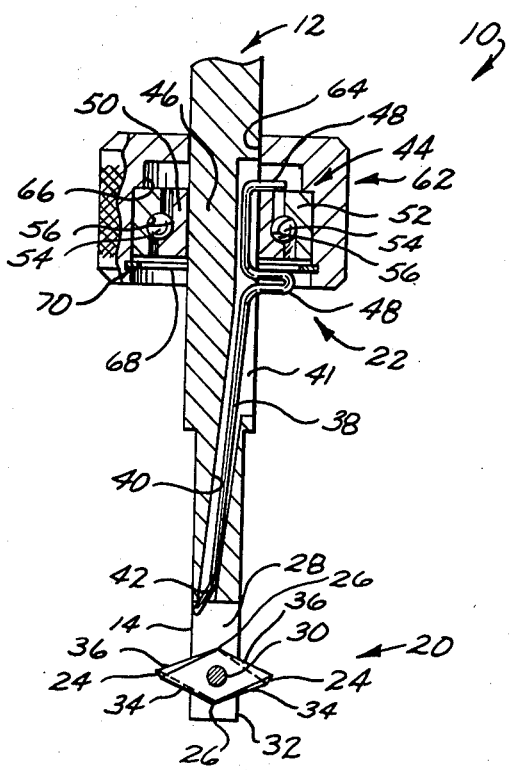
FIG. 2
FIG. 3
INVENTOR.
GERARD P. ARTAUD

United States Patent Office 3,540,325
Patented Nov. 17, 1970

3,540,325
SELF-CENTERING DEBURRING TOOL
Gerard P. Artaud, Torrance, Calif., assignor of one-half to R. W. Hodgson, Hollywood, Calif.
Filed Feb. 8, 1968, Ser. No. 704,111
Int. Cl. B23b 51/16
U.S. Cl. 77—73.5          9 Claims

ABSTRACT OF THE DISCLOSURE

A deburring or chamfering tool of a self-centering type comprising a longitudinal shaft member having a freely transversely pivotally mounted double-ended, multiple-bladed cutting element of an extremely hard cutting material for deburring either end of a workpiece hole and which is provided with controllably operable inactivation means for causing the retraction and inactivation of the cutting element when the cutting element is to be passed through a hole in a workpiece to the opposite side thereof for subsequent reactivation for the purpose of deburring the opposite end of the hole.

---

Generally speaking, the present invention relates to a self-centering deburring tool capable of deburring and/or chamfering the near end of a previously drilled hole and also the far or remote end of the previously drilled hole in a very easy-to-accomplish and rapid manner. This type of advantageous operation of the deburring tool is made possible by reason of the fact that it carries a cutting element at its forward end which is symmetrically arranged, when centrifugally horizontally positioned, for either a forwardly directed deburring and/or chamfering operation or a rearwardly directed deburring and/or chamfering operation when a control for the cutting element, which comprises a slidable longitudinal bearing means carried by a longitudinal shaft member, is in an activation position. However, when it is desired to inactivate and retract the cutting element so that it can be passed through a previously drilled hole and through the far end thereof for subsequent movement into activation position so that the far end of the hole can be deburred and/or chamfered, the bearing means is merely slidably longitudinally moved a short distance, without stopping the power-rotation of the tool, into a so-called inactivation position which causes the effective retraction and inactivation of the cutting element until said bearing means is again slidably moved in the opposite direction back into the so-called activation position, which allows centrifugal force to then rotate the symmetrical element into the transverse, operative deburring and/or chamfering position thereof. In a preferred form, the bearing means is effectively provided with protective cover means to prevent the entry of metal chips, particles, or other debris into the bearing means which might tend to interfere with the free and easy operation of the device.

It should be noted that the self-centering deburring tool may have the cutting element removed and replaced by a different type of cutting element at any time since the cutting element is very simply removably mounted with respect to the forward cutting end of the longitudinal shaft member by an effective pivot pin. It should also be noted that the cutting element can be readily sharpened, either while still pivotally mounted on the forward deburring or cutting end of the shaft member or it can be removed therefrom for automatic or machine sharpening, after which it may be replaced.

Furthermore, it should be noted that because of the forwardly converging arrangement of the forward blade means of the cutting element and because of the similar, rearwardly converging arrangement of the rear blades of the cutting element, it is capable of automatic self-centering deburring and/or chamfering cooperation with holes of various sizes and, thus, does not need changing for cooperating with a considerable range of hole sizes. Of course, if the tool is to be used with hole sizes which are very much larger than, or very much smaller than, those at the midpoint of the range capable of being deburred or chamfered by the cutting element, it may then be necessary to change the cutting element by providing either a larger cutting element or a smaller cutting element. In any case, it should be noted that a very few cutting elements of different sizes will be capable of effectively deburring and/or chamfering a very large number of different hole sizes.

With the above points in mind, it is an object of the present invention to provide a novel, effectively self-centering, double-action deburring tool capable of deburring either or both ends of a previously drilled hole from either end thereof and of doing so in an extremely simple, quick, and easy-to-operate manner which is made possible by reason of the fact that the cutting element can be very easily and simply centrifugally extended and rendered active for deburring or chamfering purposes or retracted and rendered inoperative when it is to be passed through a hole and out of the opposite end thereof for subsequent deburring and/or chamfering of same. Means for controlling the activation and inactivation of the cutting tool is so arranged as to make it possible to do this without stopping the power-rotation of the tool, and this results in accomplishing a double-ended burring and/or chamfering operation in a very short period of time.

It is a further object of the present invention to provide a deburring and/or chamfering tool which has any or all of the advantages referred to herein, including any or all of the features referred to herein, generically and/or specifically, an individually or in combination, and which is of extremely inexpensive and simple construction adapted to be manufactured at very low cost, both with respect to initial tooling cost and the cost of production per unit item, and which is virtually foolproof and failsafe and almost universally adaptable in operation, and is capable of being driven by a drill press or any other of a great variety of different types of powered units, machine tools, or units having a rotating output chuck or collet which can be engaged with respect to a rear shank end of the shaft member of the deburring and/or chamfering tool, whereby to be conducive to widespread use of the novel self-centering deburring and/or chamfering tool of the present invention for the purposes outlined herein and/or for any other substantially equivalent purposes.

Further objects are implicit in the detailed description which follows hereinafter (which is to be considered as exemplary of, but not specifically limiting, the present invention), and said objects will be apparent to persons skilled in the art after a careful study of the detailed description which follows hereinafter, and all such implicit objects are intended to be included and comprehended herein as fully as if particularly defined and pointed out herein.

For the purpose of clarifying the nature of the present invention, one exemplary embodiment is illustrated in the hereinbelow-described figures of the accompanying single drawing sheet and is described in detail hereinafter.

FIG. 1 is a perspective view of one exemplary embodiment of the present invention showing the inactivation means, comprising the rotary bearing means and protective cover, in one longitudinal slidable extreme position on an intermediate portion of the shaft member which effectively comprises a so-called activation position which allows the cutting element carried by the forward operative end of the shaft member to be moved into the transverse position shown in FIG. 1 in response to centrifugal force applied thereto when the device is power-rotated by reason of the engagement of a power-rotated chuck or collet, such as is shown fragmentarily in phantom at the rear end thereof in removable engagement with a rear engageable shank end of the shaft member. It should, of course, be understood that the power-driven phantom-line collet or chuck may be driven by a drill press or any of a number of different types of power-driven machines or units.

FIG. 2 is a view, partly in elevation and partly in section, of the device of FIG. 1 taken substantially in the direction of the arrows 2—2 of FIG. 1 but with the protective outer cover being shown in section.

FIG. 3 is a sectional view drawn to a somewhat larger scale than FIG. 2 and is taken substantially along the plane indicated by the arrows 3—3 of FIG. 2.

FIG. 4 is a fragmentary view generally similar to FIG. 3 but illustrates the device when the protective cover and bearing means comprising the inactivation means have been moved from the activation position shown in FIGS. 1–3 into an inactivation position which effectively inactivates the cutting element and moves it into fully retracted position within the circular outline defined by the shaft member so that the forward operative end of the shaft member can be passed through a previously drilled hole and out the opposite end thereof for subsequent activation of the cutting element so that upon the application of slight retraction force to the shaft member, the opposite end of the hole can be deburred or chamfered.

In the specific exemplary but non-specifically-limiting form of the invention illustrated, the self-centering deburring tool is generally designated by the reference numeral 10, as is shown in FIG. 1, and it comprises a longitudinal and usually substantially cylindrical shaft member, indicated generally at 12, having a forward operative end 14 which may be considered to be an operative deburring and/or chamfering end, and also having a rear engageable shank end, as indicated at 16, which is normally adapted to be engaged and power-rotated by a power-rotated chuck or collet means, such as indicated in phantom at 18 in FIG. 1, and which may comprise a part of a drill press, a hand drill motor unit, or any other power tool unit having a power-rotated chuck or collet means structurally and/or functionally equivalent to that shown at 18 in FIG. 1 and capable of engaging and power-rotating the rear engagement shank end 16 of the shaft member 12.

The forward operative end 14 of the shaft member 12 is provided with a freely transversely pivotally mounted, double-ended, substantially symmetrical cutting element, which is generally designated by the reference numeral 20, and which is usually made of an extremely hard material such as tungsten carbide or the like, and which is so arranged as to be capable of pivoting into a transverse operative position such as is shown in FIGS. 1–3 as a result of the centrifugal force applied thereto when the entire shaft member 12 is power-rotated, and yet being capable of being moved into a substantially longitudinal, fully retracted, and effectively inoperative position in the manner shown in FIG. 4 when the controllably operable inactivation means generally designated by the reference numeral 22 is moved from the activation position thereof shown in FIGS. 1–3 into the inactivation position thereof shown in FIG. 4. Said controllably operable inactivation means, generally designated at 22, will be described in greater detail hereinafter.

The cutting element 20, in the exemplary but non-specifically-limiting form of the invention illustrated, is of substantially diamond-shape or rhombus-like shape so that it is substantially longer than it is wide and the long diagonal thereof is such as to place the outwardly projecting, similar ends 24 thereof in positions similarly extended beyond the outer limits of the corresponding circumferential portions of the forward operative end 14 of the shaft member 12 when the cutting element 20 is in the transverse, operative position shown in FIGS. 1–3. However, the other diagonal of the diamond-shaped or rhombus-shaped cutting element 20 is much shorter and is adapted to be transversely directed when the entire cutting element 20 is pivoted into the retracted inactivation position shown in FIG. 4, which causes the corresponding apices 26 to be laterally directed and lie within the confines of the forward operative end 14 of the shaft member 12 so that no portion of the cutting element 20 projects beyond the circumferential outer surface of the shaft member 12 when the cutting element 20 is in said retracted inactivation position as shown in FIG. 4.

In the exemplary arrangement illustrated, the entire diamond-shaped or rhombus-shaped cutting element 20 is pivotally mounted within a mounting slot 28 formed in the forward operative end 14 of the shaft member 12 in a longitudinal central plane thereof and is pivotally mounted therein by a transverse pivot pin 30 which is removably engaged within the twin parts of the bifurcated portion 32 of the forward operative end 14 of the shaft member 12 which lie on each side of the central slot 28. Thus, the cutting element 20 can be easily removed and replaced with another cutting element or can be removed, separately sharpened, and replaced. Also in this connection, it should be noted that the cutting element 20 can be sharpened without such removal if desired.

The exemplary cutting element 20 illustrated will now be described when in the transversely directed operative position shown in FIGS. 1–3 wherein it will be noted that each of the outwardly projecting ends 24 thereof positioned on each side of the pivot pin 30 has two similar, forwardly converging forward edges 34, each of which effectively comprises a forward blade means which is preferably hollow ground and which may be inclined in opposite directions so as to present a properly inclined blade edge surface to a work piece, taking into account the fact that each of said ground blade edges 34 rotate and, therefore, present opposite surfaces to such a work piece. Also, in the example illustrated in FIGS. 1–3, the cutting element 20 has two similar, rearwardly converging rear edges 36 which effectively define a pair of oppositely inclined and usually hollow ground, rearward blade means also designated by the reference numeral 36.

It should be noted that the pair of forwardly converging, oppositely inclined front or forward blade edges 34 are the ones which will function for deburring and/or chamfering purposes with respect to the near end of a previously drilled hole (not shown, since such is not essential to an understanding of the operation of the tool for deburring or chamfering purposes), and that the rear pair of rearwardly converging rear blade edges 36 are the ones which are operative for deburring and/or chamfering a remote or far end of a previously drilled hole in a work piece (not shown, since such is not essential to an understanding of the operation of the tool for deburring and/or chamfering purposes). In this latter mode of operation—that is, for deburring or chamfering the far end of a hole in a work piece, it will be understood that it is first necessary to move the previously mentioned controllably operable inactivation means 22 into the inactivation position shown in FIG. 4 so that the cutting element 20 will be moved into the retracted, longitudinal, inactivation position shown in FIG. 4, which will allow it to be passed through such a previously drilled hole and out of the far end thereof, after which the controllably operable inactivation means 22 can be again moved into the activation position shown in FIGS. 1–3 so that the cutting element 20 will again be moved centrifugally into the transversely directed, operative, activation position shown in FIGS. 1–3 so that the cutting element 20 will again be moved centrifugally into the transversely directed, operative, activation position shown in FIGS. 1–3, and the rear blade-defining edges 36 can be drawn against said opposite end of a previously drilled hole for deburring and/or chamfering same. Upon completion of such a deburring or chamfering of the far end of a hole, the inactivation means 22 must again be moved to the inactivation position shown in FIG. 4 so that the entire forward operative end 14 can be withdrawn from the previously drilled hole and out of the near end thereof.

From the above brief description of the near hole end deburring and/or chamfering operation of the forwardly converging blade-defining edges 34 of the cutting element 20 and the far hole end deburring and/or chamfering operation of the rearwardly converging blade-defining edges 36 of the cutting element 20, and of the fact that both of these operations can be quickly and easily performed without stopping the power-rotation of the shaft member 12, it will be clear that a very rapid, double-action type of deburring and/or chamfering with respect to a drilled hole can be effected from either end thereof without the necessity of there being two workers at opposite ends of the drill hole or that one worker reposition himself or the work at opposite ends of the drilled hole in a work piece in order to accomplish such deburring and chamfering of both ends of the drill hole as has been the customary prior art practice.

It will be noted that because of the symmetrical arrangement of the forwardly converging blade-defining edges 34 of the cutting element 20, it may be said that said cutting element is effectively self-centering and that precisely the same thing is true with respect to the rearwardly converging blade-defining edges 36 of the cutting element 20. Thus, the device can be used for deburring and/or chamfering both ends of various different sizes of drilled holes, and no problem with respect to centering of the tool will be encountered because of the novel construction of the cutting element 20 just described in considerable detail.

The previously mentioned controllably operable inactivation means, generally designated by the reference numeral 22, comprises a longitudinal connecting member which may be made of wire or the like, and which is indicated at 38, and which in the example illustrated, extends through an angular, longitudinal hole or slot 40 in the shaft member 12 between a slot 41 at the rear end thereof and the previously mentioned forward slot 28 in the forward operative end 14 and in which the cutting element 20 is pivotally mountedf. The connecting member 38 has a forward end 42 positioned for longitudinal abutment against a portion of the cutting element 20 at a location offset from the pivotal mounting of the cutting element 20 by the pivot pin 30 so that when the connecting member 38 is moved forwardly in a manner which will be described hereinafter, said forward end 42 effectively causes the pivoting of the cutting element 20 around the pivot pin 30 until it is in the fully retracted, longitudinal inactivation position thereof shown in FIG. 4 where it is held by said forward end 42 of the connectng member 38.

Said controllably operable inactivation means, generally designated at 22, also comprises a rotatable bearing means, generally designated by the reference numeral 44, which is slidably mounted on the intermediate portion 46 of the shaft member 12 and which is effectively coupled to a rear end coupling portion, indicated at 48, of the longitudinal connecting member 38 in a manner such as to cause longitudinal movement of said connecting member 38 forwardly in an inactivating manner in response to corresponding forward movement of said bearing means 44 into the forward, slidable, extreme inactivation position shown in FIG. 4 and in a manner such as to cause rearward movement of said connecting member 38 into an activation position such as is shown in FIGS. 1–3 in response to corresponding rearward sliding movement of the bearing means 44 into the rearward slidable, extreme inactivation position of said bearing means 44 as shown in FIGS. 1–3.

In the exemplary arrangement illustrated, the rotary bearing means 44 comprises an inner, substantially annular bearing race-defining member 50 and an outer, annular bearing race-defining member 52 encircling and slightly outwardly spaced from the exterior of the inner bearing race-defining member 50 and provided with a plurality of balls 54 positioned along the annular race or raceway 56 defined therebetween. This is a conventional ball bearing type of bearing structure well known in the art, and various substantially equivalent structures may be used in lieu of the exemplary one illustrated.

In the example illustrated, the coupling means 48 merely comprises a pair of outward projections formed in the rear end of the wire of which the previously mentioned longitudinal connecting member 38 is made, and said projections comprising said coupling means 48 closely abut corresponding forward and rearward surfaces of the inner bearing race-defining member 50, thus effectively coupling the connecting member 38 to the complete bearing means 44. However, the type of coupling illustrated is exemplary only and may be modified substantially within the broad scope of the present invention.

In the exemplary but non-specifically-limiting form of the invention illustrated, the bearing means 44 may be protected by an optional protective cover means, and which may be mechanically coupled to the rotary bearing means 44 for longitudinal slidable movement therewith and which may be provided with an exterior frictional surface, such as the knurling shown in FIGS. 1, 3 and 4, for example, to facilitate the movement of the device from the activation position shown in FIGS. 1–3 into the inactivation position shown in FIG. 4 and vice versa— both of which are accomplished without stopping the power-rotation of the shaft member 12.

In the exemplary arrangement illustrated, the protective cover means comprises what might be termed a cup-shaped member 62, closed at its rear end, although centrally apertured as indicated at 64 to allow the passage of the intermediate portion 46 of the shaft member 12 therethrough, and substantially completely circumferentially encompassing and enclosing the bearing means 44 and being coupled thereto by a rear shoulder 66 abutting one end of the bearing means 44 and a snap or retaining ring 68 snapped into an interior groove 70 and abutting the forward end of the bearing means 44. This effectively locks the cup member 62 to the bearing means 44 and protects the rear open face of the bearing means 44 so that metal chips and debris will be prevented from entering the interior of the bearing means 44. There is little likelihood of debris entering through the forward end of the cup member 62 since the bearing means 44 is substantially closed in a forward direction. However, if a different type of bearing means which is somewhat open in a forward direction is employed, a disc-shaped forward closure member may be snapped into a forwardly closing relationship across the forward end of the cup member 62 at substantially the location of the retaining ring 68 and may be similarly mounted if desired.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A deburring and/or chamfering tool comprising: a longitudinal shaft member having a forward operative end and a rear engageable shank end to be engaged and power-rotated, said forward operative end of said longitudinal shaft member being provided with a freely transversely pivotally mounted double ended, multiple bladed cutting element of an extremely hard cutting material provided with a transverse pivot shaft freely transversely pivotally mounting same substantially on a longitudinal central plane of said forward cutting end of said shaft member in a mounting slot provided along said longitudinal central plane of said forward cutting end of said shaft member; and controllably operable inactivation means cooperable when moved into an inactivation position to effectively cause the retraction and inactivation of said cutting element from an outwardly projecting operative relationship thereof into a non-operative position completely within the exterior surface of the forward operative end of the longitudinal shaft member, said inactivation means comprising a longitudinal connecting member having a rear end coupling portion and a forward end positioned for longitudinal abutment against a portion of said cutting element at a location offset from the pivotal mounting thereof for effectively causing the pivoting of said cutting element into a substantially longitudinally directed, fully retracted, inactivated position in response to forward movement of said connecting member, and further comprising rotary bearing means rotatably and longitudinally slidably carried by an intermediate portion of said shaft member and coupled to said rear end coupling portion of said connecting member for longitudinal movement thereof forwardly in an inactivating manner and rearwardly in an activating manner in response to corresponding manual slidable reciprocation of said bearing means forwardly and rearwardly along the intermediate portion of said shaft member without interfering with, or requiring cessation of, power-driven rotation of said shaft member during such inactivating and activating movement of said bearing means, said rotatable bearing means comprising an inner bearing race portion, and said coupling portion at the rear end of said connecting member comprising a pair of outwardly directed projection portions positioned forwardly and rearwardly of said inner bearing race portion of said rotary bearing means which is longitudinally slidably mounted on the intermediate portion of said shaft member.

2. A tool as defined in claim 1, wherein said longitudinal shaft member is provided with a longitudinally directed slot mounting said connecting member for said longitudinal reciprocation thereof between inactivating and activating positions thereof in response to corresponding manually initiated, longitudinal slidable movement of said bearing means along the intermediate portion of said shaft member.

3. A tool as defined in claim 1, wherein said longitudinal shaft member is provided with a longitudinally directed angularly inclined slot mounting said connecting member for said longitudinal reciprocation thereof between inactivating and activating positions thereof in response to corresponding manually initiated, longitudinal, slidable movement of said bearing means along the intermediate portion of said shaft member.

4. A tool as defined in claim 1, wherein said inner bearing race portion of said rotary bearing means comprises an inner, substantially annular bearing race portion and an outer annular bearing race portion encircling and slightly outwardly spaced from the exterior of said inner bearing race portion and provided with a plurality of balls positioned along an annular race defined therebetween.

5. A tool as defined in claim 1, including a protective cover means mechanically coupled to said rotary bearing means for convenient longitudinal slidable movement of said bearing means along the intermediate portion of said shaft member and substantially enclosing said bearing means for preventing the entry of metal chips and other foreign matter into the interior of said bearing means.

6. A tool as defined in claim 5, wherein the exterior of said protective cover means is provided with frictional surface means to facilitate manual engagement thereof for longitudinal slidable movement of said protective cover means and said bearing means enclosed therewithin between said inactivating and activating positions.

7. A tool as defined in claim 1, wherein said cutting element is symmetrically mounted on said transverse pivot pin and has similarly oppositely directed, outwardly projecting end portions positioned on each side of said pivot pin having two similar, forwardly converging forward edges provided with a pair of forward blade means forwardly directed when said projecting ends of said cutting element are centrifugally moved into outwardly transversely directed, self-centered operative activated relationship with respect to a longitudinal axis of said longitudinal shaft member during power rotation thereof.

8. A tool as defined in claim 7, wherein said cutting element has two similar, rearwardly converging rear edges provided with a pair of rearward blade means rearwardly directed when said cutting ends of said cutting element are centrifugally moved into outwardly transversely directed, self-centered operative activated relationship with respect to a longitudinal axis of said longitudinal shaft member during power rotation thereof.

9. A tool as defined in claim 1, wherein said transverse pivot shaft is removably mounted in said forward operative end of said longitudinal shaft member across said mounting slot to allow the ready removal, interchanging, and replacement of said cutting element.

References Cited

UNITED STATES PATENTS

| 3,170,224 | 2/1965 | Johnson | 77—73.5 XR |
| 2,438,558 | 3/1948 | Hollander | 77—73.5 XR |
| 2,314,084 | 3/1943 | Fried | 77—73.5 |
| 963,725 | 7/1910 | Sellers | 77—73.5 XR |

FRANCIS S. HUSAR, Primary Examiner

U.S. Cl. X.R.

145—123